(12) United States Patent
Athey et al.

(10) Patent No.: US 8,360,480 B2
(45) Date of Patent: Jan. 29, 2013

(54) BLENDER JAR INTERLOCK

(75) Inventors: Stuart Walter Athey, Arcanum, OH (US); Keeley Kabala, Elgin, IL (US); Timothy Allen Mayberry, Parma, OH (US); Anthony Scott Roberts, Granger, IN (US); Christopher M. Welch, Livonia, MI (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 13/548,280

(22) Filed: Jul. 13, 2012

(65) Prior Publication Data
US 2012/0275852 A1 Nov. 1, 2012

Related U.S. Application Data

(62) Division of application No. 12/504,706, filed on Jul. 17, 2009, now Pat. No. 8,240,909.

(51) Int. Cl.
*A47J 43/046* (2006.01)

(52) U.S. Cl. ....... 285/330; 241/37.5; 366/205; 366/206; 366/314

(58) Field of Classification Search ............... 285/330; 241/37.5, 199.12, 282.1, 282.2; 366/205, 366/206, 314, 601
See application file for complete search history.

(56) References Cited

U.S. PATENT DOCUMENTS

| | | | | |
|---|---|---|---|---|
| 1,997,873 A * | 4/1935 | Poplawski | ................. | 366/206 |
| 2,284,155 A * | 5/1942 | Landgraf | .................. | 241/282.2 |
| 3,128,996 A * | 4/1964 | Kuzara | .................. | 366/314 |
| 3,315,946 A * | 4/1967 | Nissman | .................. | 241/282.2 |
| 3,612,126 A * | 10/1971 | Emmons et al. | ......... | 241/199.12 |
| 3,612,414 A * | 10/1971 | Nevison et al. | .................. | 241/36 |
| 3,786,999 A * | 1/1974 | Cabell | ......................... | 241/282.1 |
| 4,095,751 A * | 6/1978 | Artin | .......................... | 241/37.5 |
| 5,338,111 A * | 8/1994 | Trocherie et al. | ............. | 366/205 |
| 6,350,053 B1 * | 2/2002 | Morin | ......................... | 366/205 |
| 7,318,666 B1 * | 1/2008 | Lin | ............................. | 366/206 |

* cited by examiner

Primary Examiner — David Sorkin
(74) *Attorney, Agent, or Firm* — Jason S. Burnette

(57) ABSTRACT

A collar assembly for coupling a blade assembly and a removable jar to the base of a motorized blender includes an interlock assembly that prevents coupling of the blade assembly to the blender motor unless the jar is secured to the collar assembly, and prevents removal of the jar from the collar assembly when the collar and blade assembly is coupled to the blender base.

5 Claims, 8 Drawing Sheets

BLENDER JAR INTERLOCK

This application claims priority under 35 U.S.C. §120 to U.S. patent application Ser. No. 12/504,706, filed Jul. 17, 2009, the subject matter of which is incorporated herein by reference.

TECHNICAL FIELD

The present disclosure relates generally to countertop kitchen appliances, and more particularly, to blenders and similar devices that have a removable jar.

BACKGROUND

Blenders and similar countertop kitchen appliances generally include a jar into which food or other contents can be placed, and a base. Blades or a similar implement can be activated to operate on the contents of the jar. The jar is generally removable from the base for ease of use, ease of cleaning, or other reasons. The base contains a motor and controls for operating the appliance. The motor drives the blades in response to activation of one of the controls.

SUMMARY

The present disclosure is directed to an interlock for a blender or similar appliance that has a removable food receptacle or jar. According to one aspect, a blender includes a base, a motor within the base, a blade assembly operable by the motor, a collar detachably couplable to the base, a jar supported by and detachably securable to the collar, and an interlock assembly in a region defined by the collar. The interlock assembly prevents operation of the blade assembly when the collar is positioned on the base but the jar is not secured to the collar, and prevents detachment of the jar from the collar when the jar is secured to the collar and the collar is secured to the base.

In one embodiment, the interlock assembly mechanically prevents operable connection of the blade assembly with the motor when the jar is not secured to the collar.

The interlock assembly may include first and second interlocking members, where the jar is couplable to the first interlocking member, the first interlocking member has a first position in which the second interlocking member is not movable relative to the collar, and the first interlocking member is rotatable to a second position in which the second interlocking member is movable relative to the collar when the jar is coupled to the first interlocking member.

The first interlocking member may include one or more ears, and the jar may include one or more slots, such that each of the one or more ears can fixedly engage a slot of the jar. The first interlocking member may also include a plurality of tabs configured to prevent movement of the second interlocking member relative to the collar when the jar is not coupled to the first interlocking member.

The second interlocking member may include a plurality of tracks, where each track is configured to slidably receive one of the tabs of the first interlocking member. The second interlocking member may also include a plurality of apertures, where each tab of the first interlocking member is movable in one of the apertures of the second interlocking member. Each track of the second interlocking member may be integral with an aperture of the second interlocking member.

The second interlocking member may be configured so that movement of the first interlocking member from the first position to the second position is achieved in 90 or less degrees of rotation of the first interlocking member relative to the second interlocking member. The interlock assembly may be activatable to lock or unlock the collar assembly by less than ¼ turn of the jar relative to the base.

According to another aspect, a collar assembly for a blender includes a collar couplable to a blender jar and to a blender base, a first interlocking ring concentric with the collar, a second interlocking ring concentric with the first interlocking ring, a tab radially extending from the first interlocking ring, a track defined in the second interlocking ring, and an aperture integral with the track. The first interlocking ring is rotatable relative to the second interlocking ring to move the tab between a first position in the track and a second position in the aperture.

In one embodiment, when the tab is in the first position, the second interlocking ring mechanically prevents operable coupling of a blade assembly with a motor of the blender. When the tab is in the second position, the second interlocking ring permits operable coupling of the blade assembly with the motor of the blender.

The first interlocking ring may include a plurality of tabs, and the second interlocking ring may include a plurality of tracks, where each tab of the first interlocking ring is movable in one of the tracks. The tabs of the first interlocking ring and the tracks of the second interlocking ring may be radially spaced so that movement of the tabs from the first position to the second position is accomplished by rotation of the first interlocking ring relative to the collar of less than ninety degrees.

According to another aspect, a countertop kitchen appliance for processing food includes a base, a motor within the base, a collar supported by and detachable from the base, a jar supported by and detachable from the collar, an implement operable on contents of the jar, an implement-motor coupler, and an interlock assembly. The implement-motor coupler includes a first coupler coupled to the implement and a second coupler coupled to the motor. When actuated, the interlock assembly couples the first coupler to the second coupler. Coupling of the first and second couplers secures the collar to the base. When the collar is secured to the base, the jar is locked to the collar. The interlock assembly further prevents detachment of the jar from the collar unless the collar is decoupled from the base.

The interlock assembly may include a first interlocking member and a second interlocking member, where the first interlocking member is rotatable relative to the second interlocking member and the second interlocking member is slidable relative to the first interlocking member.

The first interlocking member may have a position in which the second interlocking member is non-slidable relative to the first interlocking member and the first coupler is spaced from the second coupler when the first interlocking member is in the first position. The first interlocking member may have a second position in which the second interlocking member is slidable relative to the first interlocking member and the first coupler is seatable within the second coupler when the first interlocking member is in the second position. The appliance may include at least one retainer that supports the first interlocking ring within the collar. The jar may have a non-threaded portion, which couples the jar to the collar.

BRIEF DESCRIPTION OF THE DRAWINGS

In the drawings, like reference numerals refer to corresponding parts in the several views. To facilitate explanation, elements shown in the figures are not necessarily drawn to scale and may or may not be drawn in proportionate size to one another.

DETAILED DESCRIPTION OF THE DRAWINGS

Figure 1:
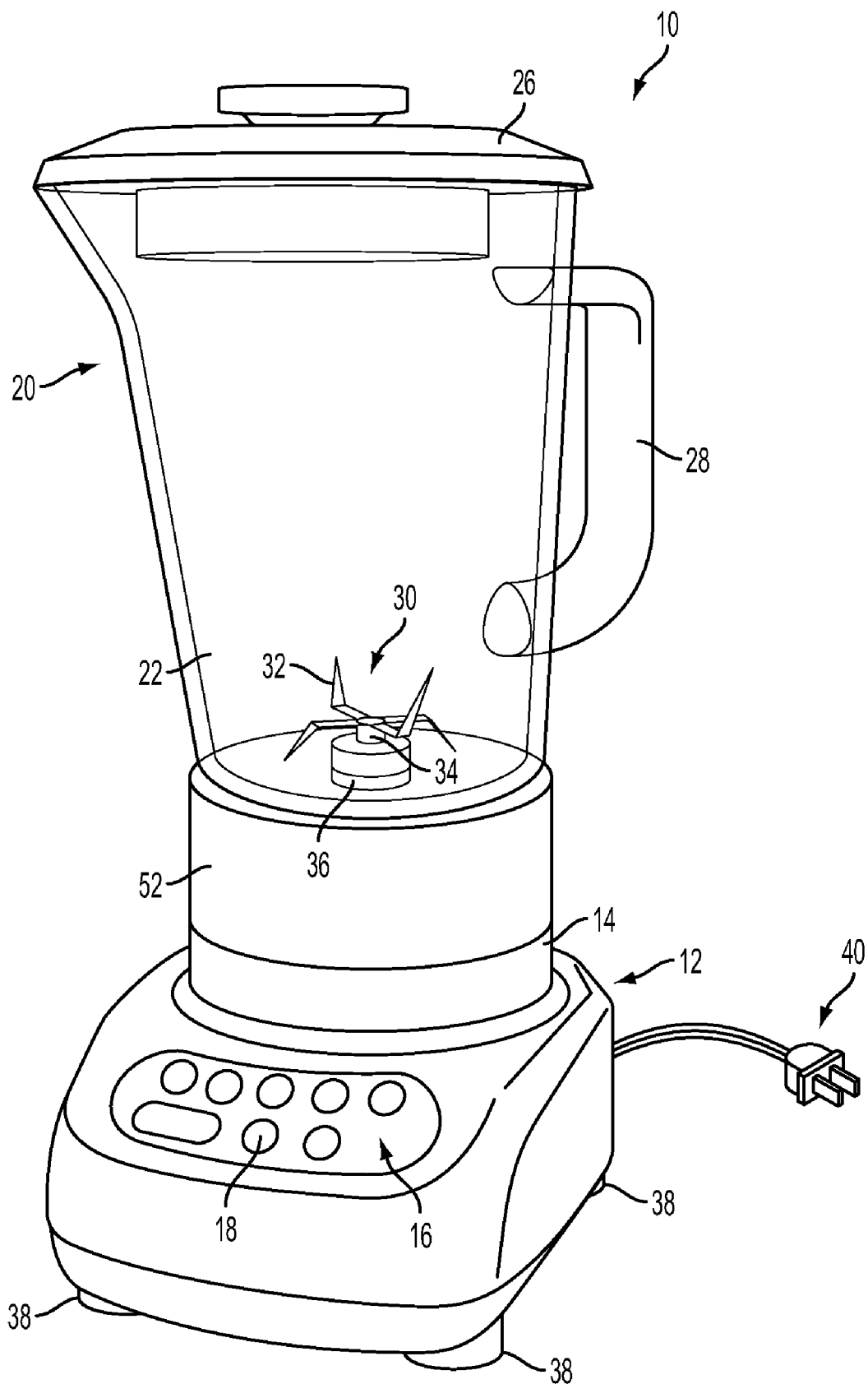
FIG. 1 is a perspective view of an exemplary blender including a base, a collar, a blade assembly, and a jar.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, there is shown a blender 10, which includes a base 12, a removable jar 20, a blade assembly 30, and a collar 52. The collar 52 detachably couples the jar 20 to the base 12 and detachably couples the blade assembly 30 to a motor 46 (shown schematically in FIGS. 9-10) within the base 12. According to this disclosure, once secured in the collar 52, the jar 20 cannot be removed from the collar 52 unless the collar 52 is decoupled from the base 12. Also, the blade assembly 30 cannot be operated by the motor 46 unless the jar 20 is secured in the collar 52.

In general, the base 12 of the blender 10 has a neck 14 extending upwardly therefrom. A control pad 16 is supported by the base 12. The control pad 16 includes one or more controls 18 for operating the blender 10, such as membrane switches, buttons, dials, slides, or the like. The base 12 is supported above a countertop or other surface by a plurality of feet 38. The base 12 includes a housing, which is typically made of die-cast metal or a plastic such as polycarbonate. Electrical current is typically supplied to the base 12 by a plug 40, which is connectable to a wall outlet; however, one or more features of the blender 10 may alternatively be driven by battery power.

Figure 2:
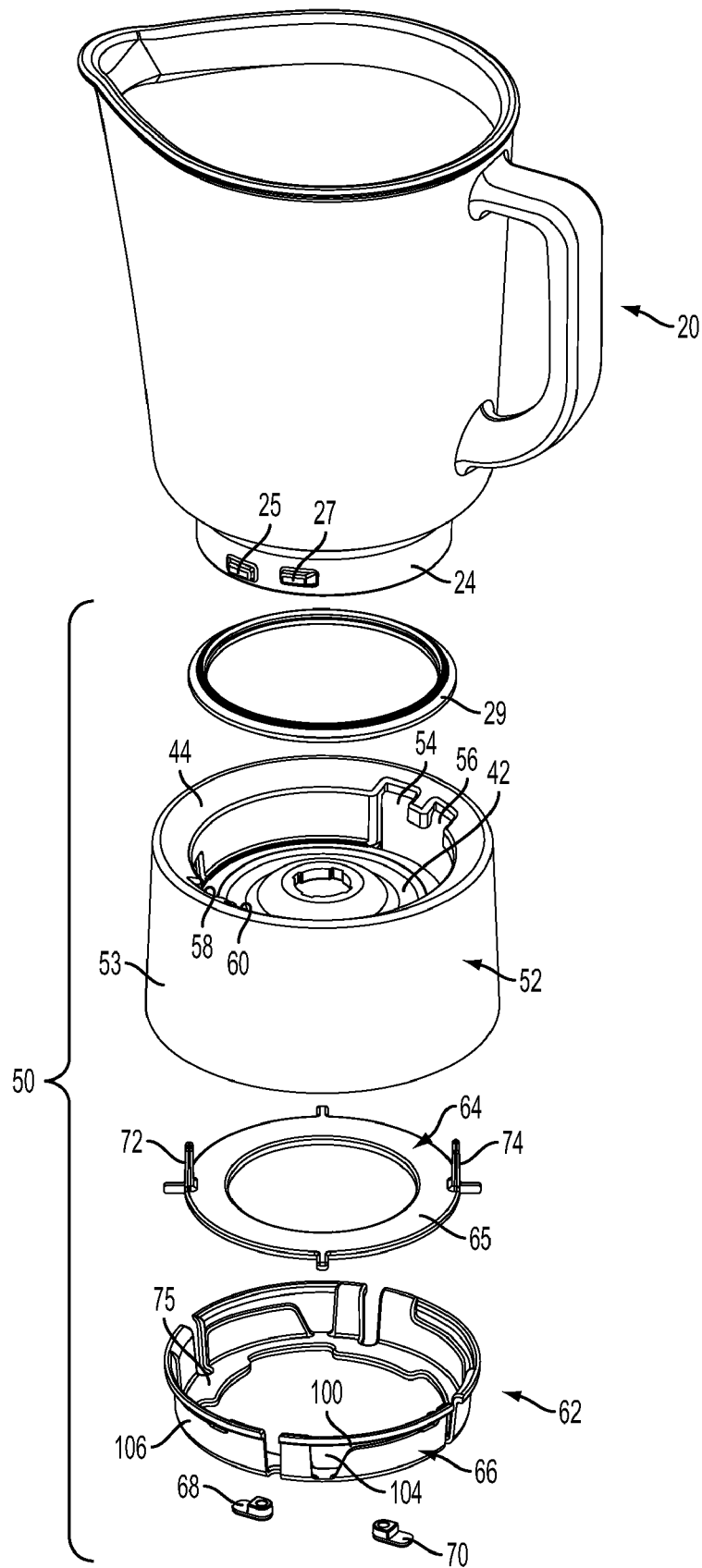
FIG. 2 is an exploded view of the blender of FIG. 1, showing an interlock assembly.

The jar 20 includes a receptacle 22 and a coupling portion 24. Tabs 25, 27 extend from an outer surface of the coupling portion 24 as shown in FIG. 2. In the illustrated embodiment, the outer surface of the coupling portion 24 is non-threaded. Another pair of tabs 25, 27 extends from the opposite side of the coupling portion 24, such that the pairs of tabs 25, 27 are separated by approximately 180 degrees on the outer surface of the coupling portion 24. Each set of tabs 25, 27 engages an ear 72, 74 of the interlock assembly 62, respectively, when the jar 20 is secured in the collar 52, as further described below.

In another embodiment (not shown), the outer surface of the coupling portion 24 is threaded, and an inner surface of the collar 52 is threaded to mate with the threaded portion of the coupling portion 24. In such embodiment, the threading is used to couple the jar 20 to the collar 52, in place of the tabs 25, 27. An indentation is defined in the coupling portion 24 at the end of the thread, such that an ear 72, 74 engages the indentation when the jar 20 is threaded into the collar 52. When the ear 72, 74 engages the indentation on the coupling portion 24, the interlock assembly 62 is actuated to secure the collar 52 to the base 12 and connect the blade assembly 30 with the motor 46.

In one embodiment, the thread typically extends once around the circumference of the coupling portion 24 (i.e., about 360 degrees), so that minimal rotation of the jar 20 is required to achieve the locked position, or for other reasons. In general, the length of the thread determines how many degrees of rotation are required to achieve the locked or unlocked position. The interlock assembly 62 may therefore be actuated by ¼ turn, less than ¼ turn, or more than ¼ turn of rotation of the jar 20, depending on the configuration of the thread.

As is well known, the jar 20 may also include a lid 26 and a handle 28. The jar 20 is typically made of plastic (e.g., polycarbonate), glass, or stainless steel.

Food, beverages or other items may be placed in the receptacle 22 to be operated on by the blade assembly 30. The blade assembly 30 includes one or more blades 32, a blade shaft 34, and a bushing 36. Any suitable type of cutting, grinding, mixing, slicing, blending or similar implement may be incorporated into the blade assembly 30. The blade shaft 34 extends downwardly through the bushing 36 and the inner region defined by the collar 52.

The motor 46 is mounted in the housing 14 to align the drive shaft 47 (FIGS. 9-10) with the blade shaft 34, among other things. The motor 46 is typically configured to operate at multiple speeds, which are selectable via the controls 18. In operation, the motor 46 rotates the drive shaft 47 in a forward or clockwise direction, or in the reverse or counterclockwise direction. The motor 46 is an electric motor, such as a universal motor, permanent magnet DC (PMDC) motor, or other type of electric motor suitable for use in a kitchen appliance of the type described herein.

Referring to FIG. 2, the collar 52 is part of a collar assembly 50, which operably connects the blade shaft 34 to the motor 46 only when the jar 20 is secured in the collar 52. The collar assembly 50 also includes a gasket 29, an interlock assembly 62, and one or more retainers 68, 70.

Figure 10:
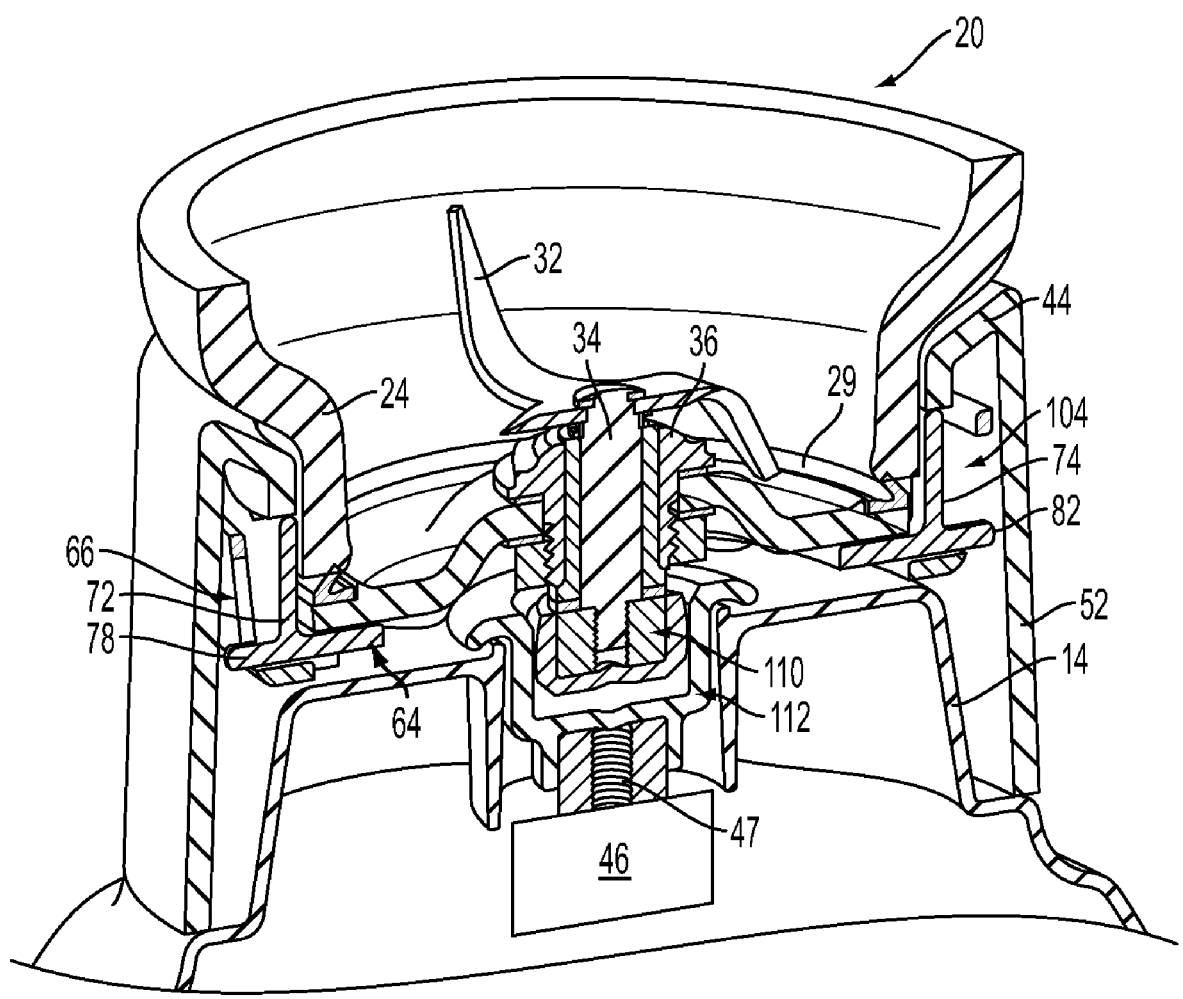
FIG. 10 is a fragmentary sectional perspective view of the blender of FIG. 1, showing the collar secured to the blender base in an unlocked position, with the jar secured to the collar, and showing the motor schematically.

The collar 52 has a substantially vertically extending wall 53. The wall 53 is positioned adjacent an outer surface of the neck 14 when the collar 52 is coupled to the base 12, as best shown in FIG. 10.

The collar 52 also has a lip 44. Slots 54, 56, 58, 60 are defined in the lip 44. Each of the slots 58, 60 is sized to allow insertion therein of the tabs 25, 27, respectively, and each of the slots 54, 56 is similarly sized to allow insertion therein of the other pair of tabs 25, 27 that are not shown. The collar is made of a polycarbonate or other plastic material.

Figure 9:
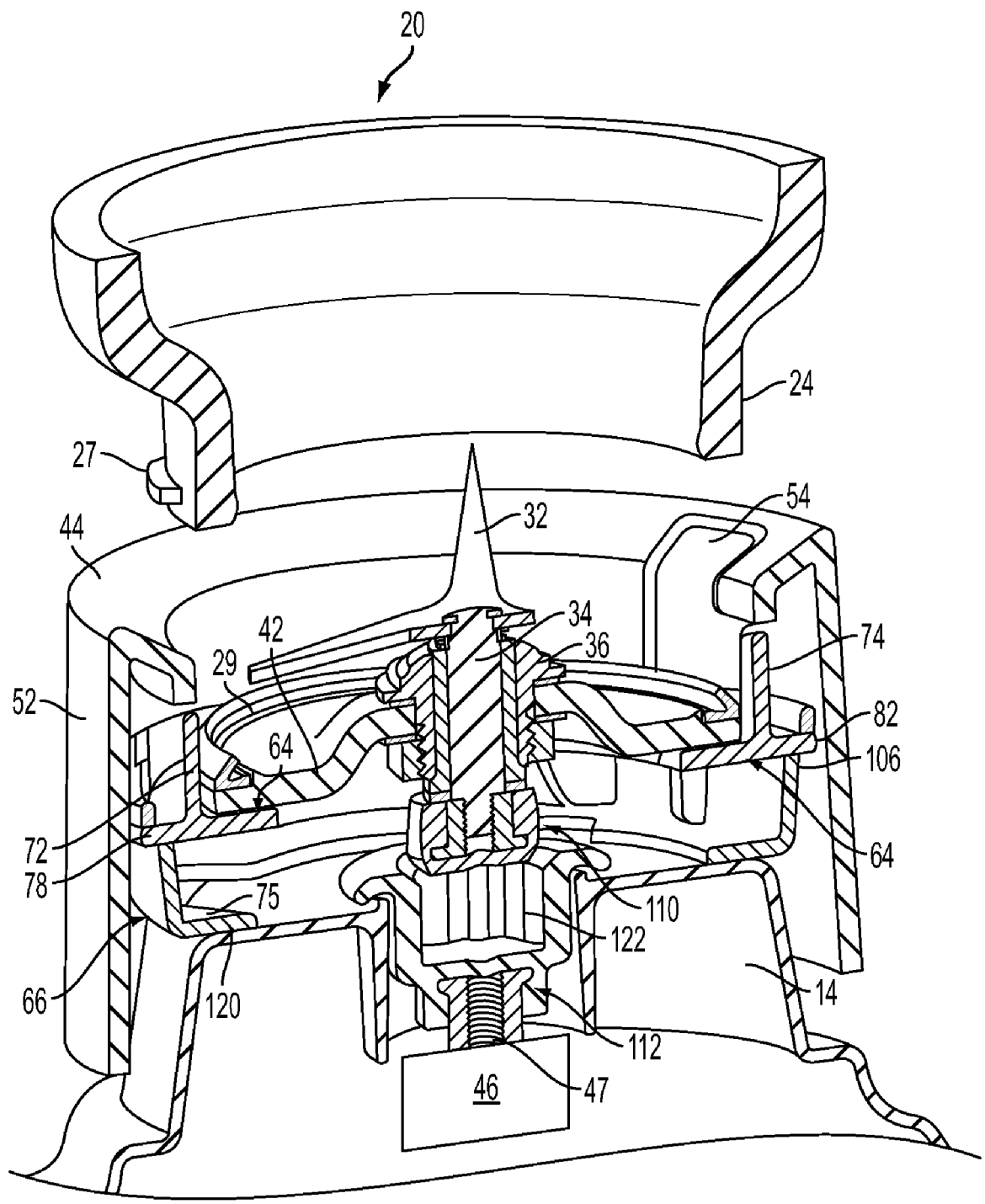
FIG. 9 is a fragmentary sectional perspective view of the blender of FIG. 1, showing the collar positioned on the blender base in a locked position, with the jar detached from the collar, and showing the motor schematically.

A support surface 42 extends from the lip 44 within the region defined by the wall 53 of the collar 52. Typically, the support surface 42 supports the contents of the jar 20 to be operated on by the blade assembly 30. In one embodiment, the support surface 42 also supports the blade assembly 30. The interlock assembly 62 is installed at least partially underneath the support surface 42 within the region defined by the wall 53 of the collar 52, as best shown in FIGS. 9-10.

The interlock assembly 62 includes a rotating member 64 and a sliding member 66. The rotating member 64 has an annular element 65. Ears 72, 74 are disposed at about 180 degrees from each other on the perimeter of the annular element 65 and project substantially perpendicularly to the annular element 65. A plurality of tabs 76, 78, 80, 82 are spaced from each other and extend outwardly from the perimeter of the annular element 65. The tabs 76, 78, 80, 82 project substantially perpendicularly relative to the ears 72, 74. The tabs 78, 82 are positioned adjacent to and may be integral with the ears 72, 74, respectively. The ears 72, 74 and the tabs 76, 78, 80, 82 may be integral with the annular element 65 or may be fixed thereto by a molding process, adhesive, or the like.

Figure 3:
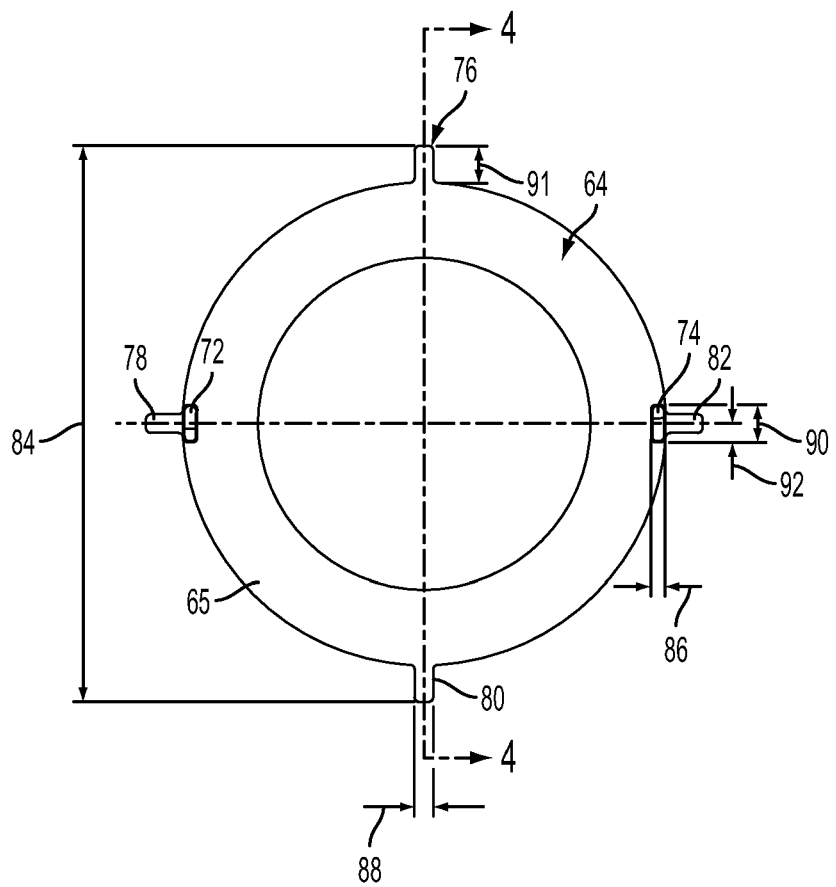
FIG. 3 is a top plan view of a rotating member of the interlock assembly of FIG. 2.
Figure 4:
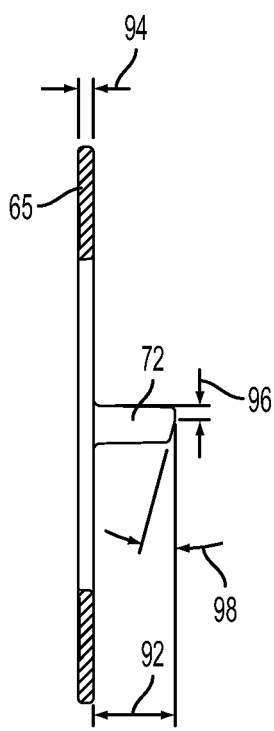
FIG. 4 is a sectional view of the rotating member of FIG. 3.

Referring to FIGS. 3-4, the ears 72, 74 of rotating member 64 have a thickness 86, which is less than or equal to the thickness of the tabs 25, 27. The ears 72, 74 also have a width 90 that is slightly less than the distance between the opposing tabs 25, 27. The ears 72, 74 also have a length 92. The thickness 86, width 90 and length 92 of the ears 72, 74 are defined so that each of the ears 72, 74 sits in a seat defined by the pair of tabs 25, 27 and the outer surface of the jar 20 when the jar 20 is installed in the collar 52. Each of the ears 72, 74 has a top surface that includes a non-beveled portion 96 and a beveled portion defined by angle 98.

The rotating member 64 has an outer diameter 84. The tabs 76, 78, 80, 82 have a substantially uniform thickness. The tabs 76, 78, 80, 82 have a length 91 that is substantially the same for all of the tabs. The outer diameter 84, the length 91, and the thickness of the tabs 76, 78, 80, 82 are defined so that the tabs 76, 78, 80, 82 are movable in the tracks 100, stops 102, or apertures 104 of the sliding member 66 as described below. The length 91 of each of the tabs 76, 78, 80, 82 is defined to extend through the corresponding track 100 so as to prevent movement of the annular element 75 when the tabs 76, 78, 80, 82 are positioned in their corresponding track 100 or in their corresponding stop 102.

In the illustrated embodiment, the thickness 94 of the annular element 65 substantially corresponds to the thickness of the tabs 76, 78, 80, 82. In general, the thickness 94 also corresponds to the size of the stop 102, such that if the thickness 94 is increased relative to the size of the stop 102, the amount of force required to overcome the stop 102 increases, and vice versa.

Figure 5:
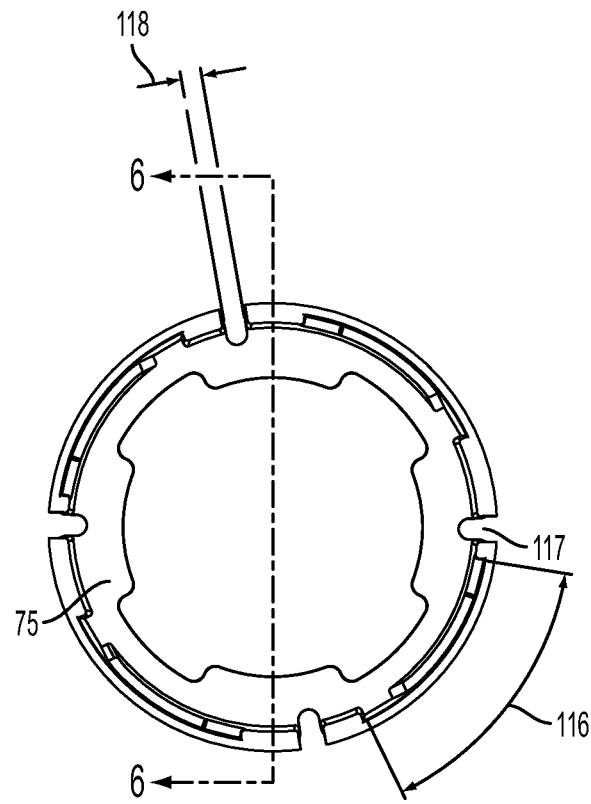
FIG. 5 is a top plan view of a sliding member of the interlock assembly of FIG. 2.
Figure 6:
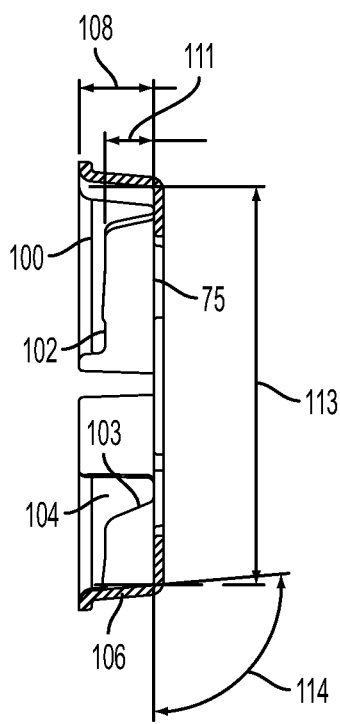
FIG. 6 is a sectional view of the sliding member of FIG. 4.

The sliding member 66 includes an annular member 75 and a wall 106 extending substantially perpendicularly to the annular member 75. Referring to FIGS. 5-6, a plurality of tracks 100 are defined in the wall 106. The number of tracks defined in the wall 106 corresponds to the number of tabs 76, 78, 80, 82 of the rotating member 64. The length of each track 100 determines amount of rotation of jar 20 required to lock and unlock the jar 20 from the collar 52. The length of each track 100 is defined by an angular distance 116, which is substantially the same for each of the tracks 100. The length of each track 100; is generally such that locking and unlocking of the jar 20 from the collar 52 is accomplished by ¼ turn or less. In the illustrated embodiment, there are four tabs 76, 78, 80, 82; four corresponding tracks 100, and the length of each track 100 is such that locking and unlocking of the jar 20 is accomplished with about a 60 degree rotation (⅙ turn) of the jar 20.

Also defined in the wall 106 are, at one end of each track 100, a stop 102, and at the other end of each track 100, an aperture 104. In general, the length of each track 100 is greater than its height. In the illustrated embodiment, each track 100 is horizontally oriented and each aperture 104 is vertically oriented. All of the apertures 104 have substantially the same dimensions, as do all of the stops 102. The height of the apertures 104 is greater than the height of the tracks 100, and the length of the apertures 104 is shorter than the length of the tracks 100.

Each stop 102 is configured to require an application of force to initiate travel of the tabs 76, 78, 80, 82 away from the stops 102 into the tracks 100 toward the apertures 104.

Figure 8:
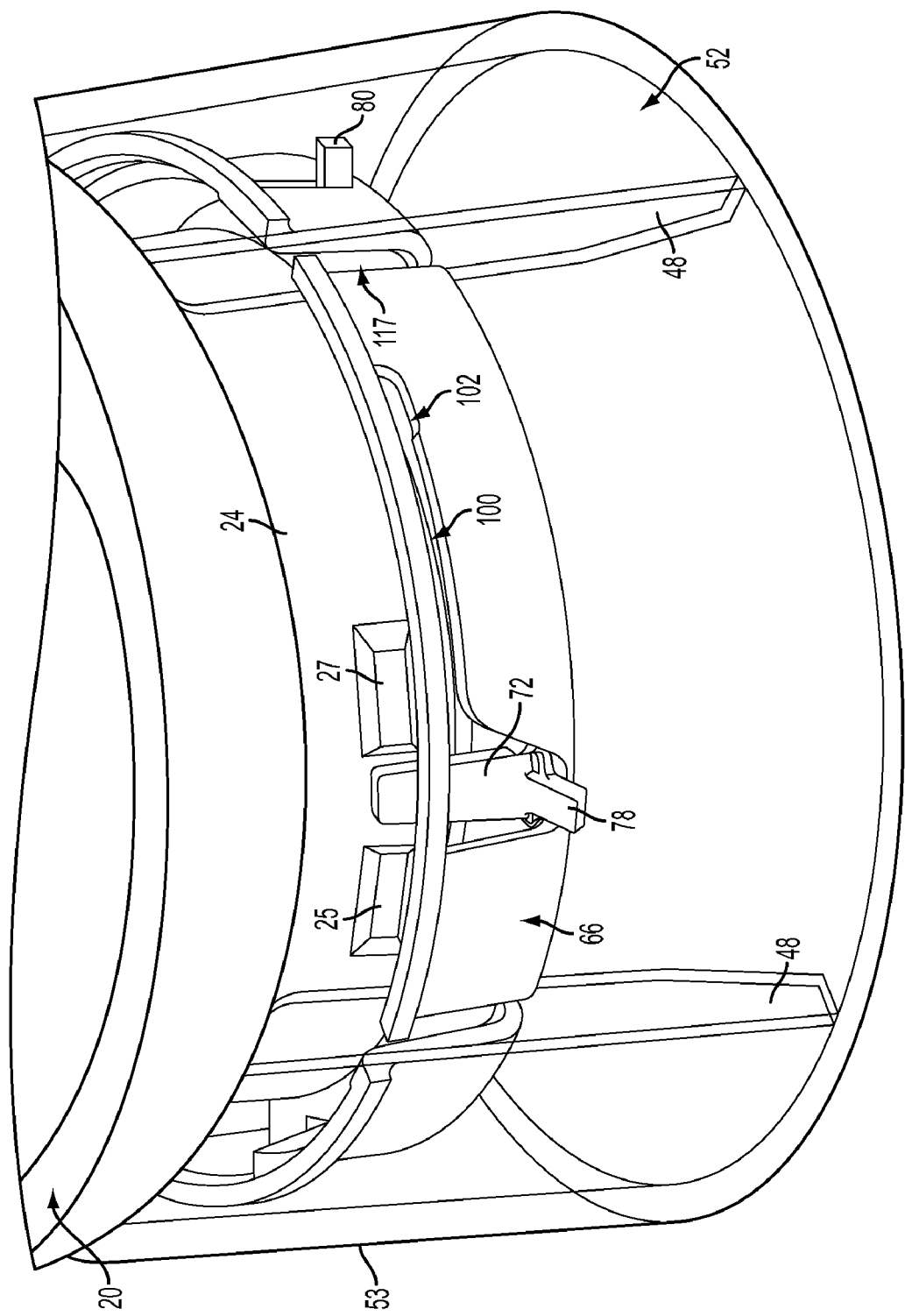
FIG. 8 is a fragmentary perspective view of the interlock assembly of FIG. 7, showing inner portions of the collar assembly in phantom and showing the interlock assembly in an unlocked position.

Each aperture 104 has a height 111 that is configured so that the blade coupler 110 and the motor coupler 112 are operably connected when the interlock assembly 62 is in the unlocked position (FIGS. 8 and 10). Each aperture 104 has an angled side 103 that merges with a side of its corresponding track 100. The angled side 103 allows the jar 20 to be unlocked from the collar 52 after the jar and collar are decoupled from the base 12. In one embodiment, removal of the jar 20 from the collar 52 after removal of the jar and collar combination from the base 12, is accomplished by at least slightly tilting or inverting the jar and collar combination and rotating the jar 20 in the opposite direction as was used to install the jar 20 in the collar 52.

The annular element 75 of the sliding member 66 has a diameter 113, which is less than the outer diameter 84 of the rotating member 64, but greater than the outer diameter 84 minus two times the length 91 of the tab 76.

Figure 7:
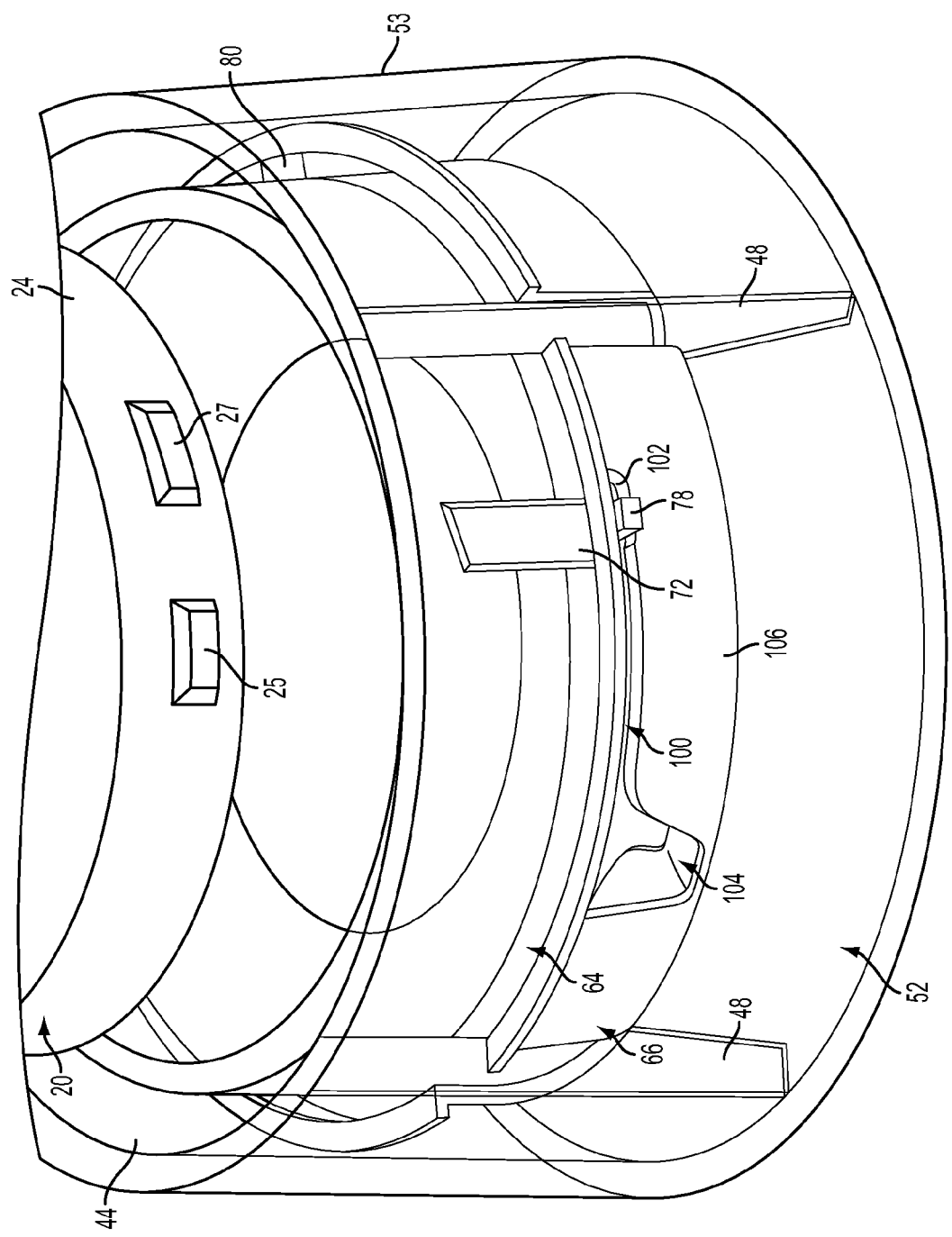
FIG. 7 is a fragmentary perspective view of the interlock assembly of FIG. 2, showing inner portions of the collar assembly in phantom and showing the interlock assembly in a locked position.

The wall 106 has a height 108 that is defined to ensure that the blade coupler 110 and the motor coupler 112 are mechanically disconnected when the interlock assembly 62 is in the locked position (FIGS. 7 and 9). The height 108 is greater than the thickness 94 of the rotating member 64. The wall 106 is disposed relative to the annular element 75 at an angle 114. In the illustrated embodiment, angle 114 is slightly greater than 90 degrees or about 95 degrees.

The wall 106 also has a plurality of channels 117 defined therein. Each channel 117 has a width 118, which is sized to slidably receive a corresponding guide 48 of the collar 52. The guides 48 are integral with the interior of the collar 52 and located underneath the lip 44, as shown in phantom in FIGS. 7-8.

The retaining members 68, 70 are fixed to the rotating member 64 to retain the interlock assembly 62 within the collar 52. The rotating member 64, sliding member 66, and retaining members 68, 70 are typically made of an impact-resistant plastic material or resin. In the illustrated embodiment, these components are made using an acrylonitrile-butadiene-styrene (ABS) resin.

In general, the components of the interlock assembly 62 are concentrically oriented. The sliding member 66 fits within the region defined by wall 53 of the collar 52, and the annular element 65 of the rotating member 64 fits within the region defined by the wall 106 of the sliding member 66. The collar 52, rotating member 64, and sliding member 66 each have an inner region through which the blade shaft 34 extends.

In operation, rotating member 64 is rotatable with the jar 20 when the ears 72, 74 are engaged with their respective set of tabs 25, 27. Sliding member 66 remains stationary while rotating member 64 rotates with the jar 20. Sliding member 66 is slidable relative to the collar 52 along the guides 48 when the jar 20 and rotating member 64 have been rotated to a position in which tabs 76, 78, 80, 82 are located in their respective apertures 104.

Once installed on the collar 52, the jar 20 is removed from the collar 52 by rotation in either a clockwise or a counter-clockwise direction. In the illustrated embodiment, removal of the jar 20 from the collar 52 is accomplished by counterclockwise rotation. Such rotation of the jar 20 causes the tabs 76, 78, 80, 82 to exit the aperture 104 and enter the track 100. Such movement of the tabs 76, 78, 80, 82 forces the sliding ring 66 to move in a downwardly direction, creating space between the annular element 65 and the annular element 75. As a result, a mechanical decoupling of the blade coupler 110 and motor coupler 112 occurs.

When the jar 20 is fully removed from the collar 52 (FIGS. 7 and 9), the tabs 76, 78, 80, 82 reside in their respective stops 102. As a result, the interlock assembly 62 maintains the locked position. Thus, while the collar and blade assembly may be placed onto the blender housing 12 without the jar 20, the mechanical separation of the blade and motor couplers 110, 112, provided by the interlock assembly 62, prevents operation of the blade assembly 30 unless the jar 20 is installed in the collar 52.

The jar 20 is secured to the collar 52 by rotation in either a clockwise or a counterclockwise direction. In the illustrated embodiment, the jar 20 is secured to the collar 52 by clockwise rotation. When the jar 20 is fully installed in the collar 52 (FIGS. 8 and 10), operation of the blade assembly 30 by the motor 46 is enabled.

To install the jar 20 into the collar 52, the pairs of tabs 25, 27 are aligned with the respective slots 54, 56, 58, 60 in the collar 52. Such alignment results in engagement of the ears 72, 74 by the tabs 25, 27 within the collar 52. Engagement of the ears 72, 74 by their corresponding tabs 25, 27 enables the rotating member 64 to rotate with rotation of the jar 20. Such rotation urges the tabs 76, 78, 80, 82 out of their respective stops 102 and causes the tabs 76, 78, 80, 82 to travel in their respective tracks 100 toward their respective apertures 104. When the jar 20 has been sufficiently rotated (i.e. ¼ turn or less), movement of the sliding member 66 is enabled by travel of the tabs 76, 78, 80, 82 in the apertures 104. In the illustrated embodiment, such travel of the sliding member 66 is in upwardly and downwardly directions relative to the collar 52, enabling the sliding member 66 to be raised and lowered relative to the collar 52.

When the sliding member 66 is slidable, the interlock assembly 62 is transitionable from the locked position to the unlocked position or vice versa. In the illustrated embodiment, travel of the sliding member 66 in the upwardly direction relative to the collar 52 moves the interlock assembly 62 into the unlocked position, and downwardly travel of the sliding member 66 moves the interlock assembly 62 into the locked position. In other words, in the illustrated embodiment, clockwise rotation of the rotatable member 64 enables upwardly movement of the sliding member 66 to the unlocked position, while counterclockwise rotation of the rotatable member 64 results in downwardly movement of the sliding member 66 to the locked position.

The sliding movement of the sliding member 66 into the unlocked position allows the blade and motor couplers 110, 112 to mechanically connect. In the illustrated embodiment, the coupler 112 receives the blade coupler 110 when the interlock assembly 62 is in the unlocked position.

When the jar 20 is fully secured to the collar 52, and the jar and collar assembly is placed on the neck 14, the jar 20 is not removable from the collar 52 due to the mating configuration of the ears 72, 74 with their corresponding tabs 25, 27, and the mating configuration of the tabs 76, 78, 80, 82 with their corresponding apertures 104. The tabs 25, 27 define a space therebetween that is just large enough to house the corresponding ear 72, 74. Similarly, the bottom of each aperture 104 is sized just slightly greater than its corresponding tab 76, 78, 80, 82, in order to prevent horizontal movement of the tab 76, 78, 80, 82 therein. Thus, when the jar and collar assembly is installed on the neck 14, the ears 72, 74 fixedly seat between their corresponding tabs 25, 27, and the tabs 76, 78, 80, 82 fixedly seat at the bottom of their corresponding aperture 104.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, although a blender is depicted in the figures, it should be understood that the present invention is also applicable to food processors, choppers, frozen drink makers, and similar devices that have a removable receptacle.

There are a plurality of advantages of the present disclosure arising from the various features of the apparatus, system, and method described herein. It will be noted that alternative embodiments of the apparatus, system, and method of the present disclosure may not include all of the features described yet still benefit from at least some of the advantages of such features. Those of ordinary skill in the art may readily devise their own implementations of the apparatus, system, and method that incorporate one or more of the features of the present invention and fall within the spirit and scope of the present disclosure as defined by the appended claims.

The invention claimed is:

1. A collar assembly for a blender, comprising:
   a collar couplable to a blender jar and to a blender base,
   a first interlocking ring concentric with the collar,
   a second interlocking ring concentric with the first interlocking ring,
   a tab radially extending from the first interlocking ring,
   a track defined in the second interlocking ring,
   an aperture integral with the track,
   wherein the first interlocking ring is rotatable relative to the second interlocking ring to move the tab between a first position in the track and a second position in the aperture.

2. The collar assembly of claim 1, wherein when the tab is in the first position, the second interlocking ring mechanically prevents operable coupling of a blade assembly with a motor of the blender.

3. The collar assembly of claim 2, wherein when the tab is in the second position, the second interlocking ring permits operable coupling of the blade assembly with the motor of the blender.

4. The collar assembly of claim 3, wherein the first interlocking ring comprises a plurality of tabs, the second interlocking ring comprises a plurality of tracks, and each tab of the first interlocking ring is movable in one of the tracks.

5. The collar assembly of claim 4, wherein the tabs of the first interlocking ring and the tracks of the second interlocking ring are radially spaced so that movement of the tabs from the first position to the second position is accomplished by rotation of the first interlocking ring relative to the collar of less than ninety degrees.

* * * * *